(12) United States Patent
Sandström et al.

(10) Patent No.: US 10,545,660 B2
(45) Date of Patent: Jan. 28, 2020

(54) MULTI TOUCH COMBINATION FOR VIEWING SENSITIVE INFORMATION

(71) Applicant: BlackBerry Limited, Waterloo (CA)

(72) Inventors: Henrik Sandström, Hässleholm (SE); Carl Fredrik Alexander Berglund, Malmö (SE)

(73) Assignee: BlackBerry Limited, Waterloo, Ontario (CA)

( * ) Notice: Subject to any disclaimer, the term of this patent is extended or adjusted under 35 U.S.C. 154(b) by 417 days.

(21) Appl. No.: 13/887,003

(22) Filed: May 3, 2013

(65) Prior Publication Data

US 2014/0331188 A1    Nov. 6, 2014

(51) Int. Cl.
*G06F 3/041*       (2006.01)
*G06F 3/0488*      (2013.01)

(52) U.S. Cl.
CPC .................. *G06F 3/04883* (2013.01)

(58) Field of Classification Search
CPC ................... G06F 3/0488; G06F 21/00; G06F 2203/04808; G06F 3/04883; G06T 13/80
USPC .......................................... 345/156, 173–184
See application file for complete search history.

(56) References Cited

U.S. PATENT DOCUMENTS

| 2007/0150842 | A1  | 6/2007  | Chaudhri et al. |
| 2007/0152984 | A1* | 7/2007  | Ording ................ G06F 3/04845 345/173 |
| 2009/0307768 | A1* | 12/2009 | Zhang ................. G06F 3/04883 726/19 |
| 2011/0055739 | A1* | 3/2011  | MacFarlane et al. ........ 715/764 |
| 2011/0113182 | A1  | 5/2011  | De Los Reyes |
| 2013/0027404 | A1* | 1/2013  | Sarnoff ..................... G06T 1/20 345/441 |
| 2013/0040562 | A1* | 2/2013  | Song ................... H04M 1/7253 455/41.1 |
| 2013/0050150 | A1* | 2/2013  | Chang et al. ................. 345/176 |

FOREIGN PATENT DOCUMENTS

EP          2393000         12/2011

OTHER PUBLICATIONS

Extended European Search Report in European Application No. 13166554.9, dated Aug. 2, 2013, 7 pages.
Communication Pursuant to Article 94(3) EPC issued in European Application No. 13166554.9 dated Apr. 3, 2017.

* cited by examiner

*Primary Examiner* — Insa Sadio
(74) *Attorney, Agent, or Firm* — Fish & Richardson P.C.

(57) ABSTRACT

A method at an electronic device including a user input device, the method comprising: receiving data comprising displayable content and data indicating that touch events corresponding to a pattern of multiple touches are to be detected in order to display the displayable content; upon detecting touch events corresponding to the pattern of multiple touches, displaying the displayable content; and ceasing to display the displayable content once the touch events corresponding to the pattern of multiple touches are no longer detected.

25 Claims, 12 Drawing Sheets

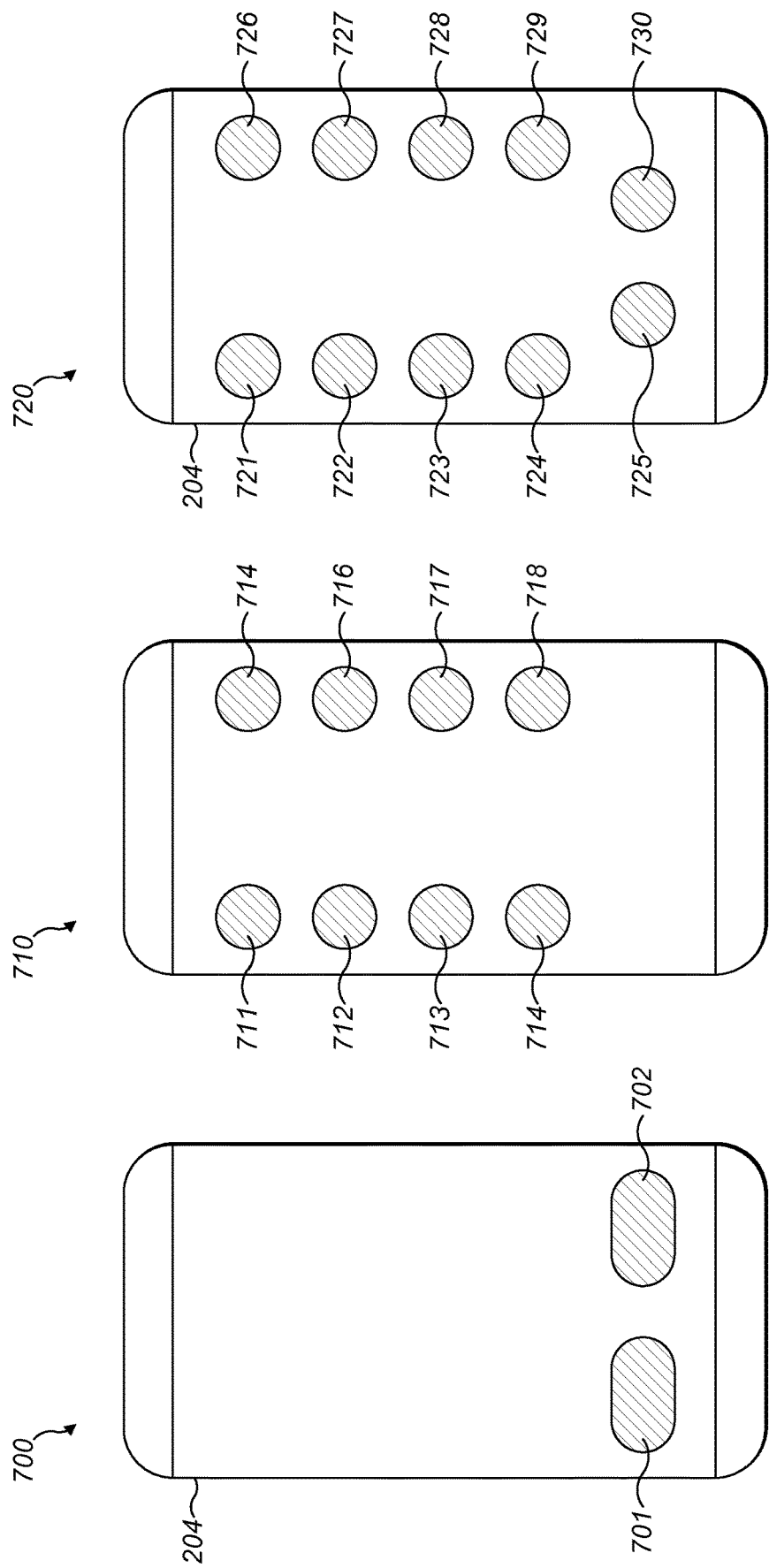

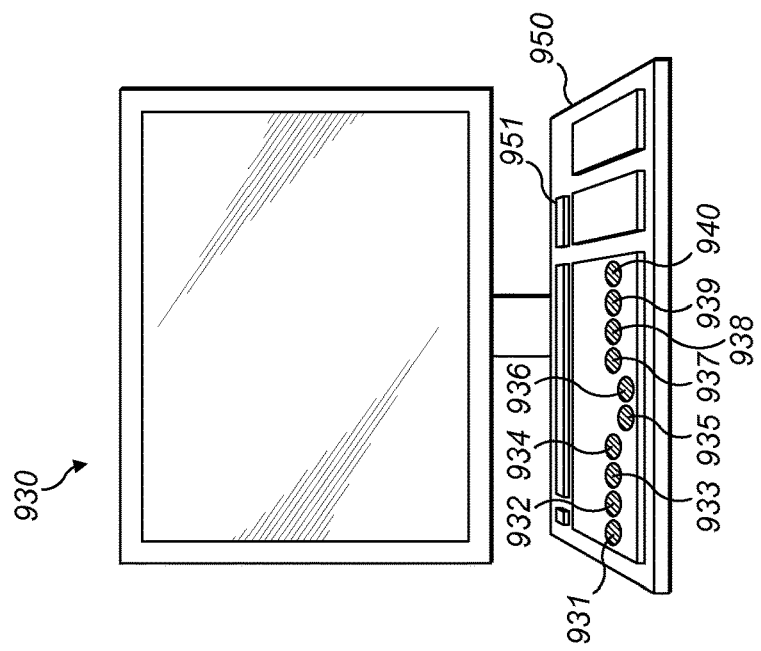
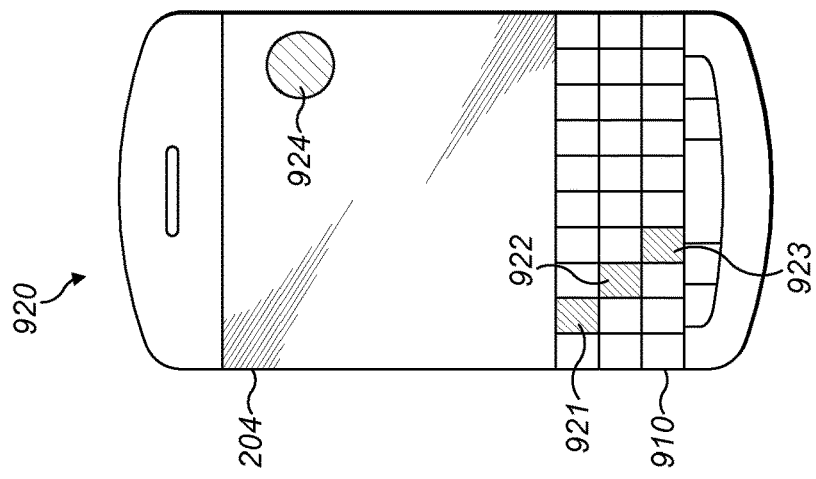
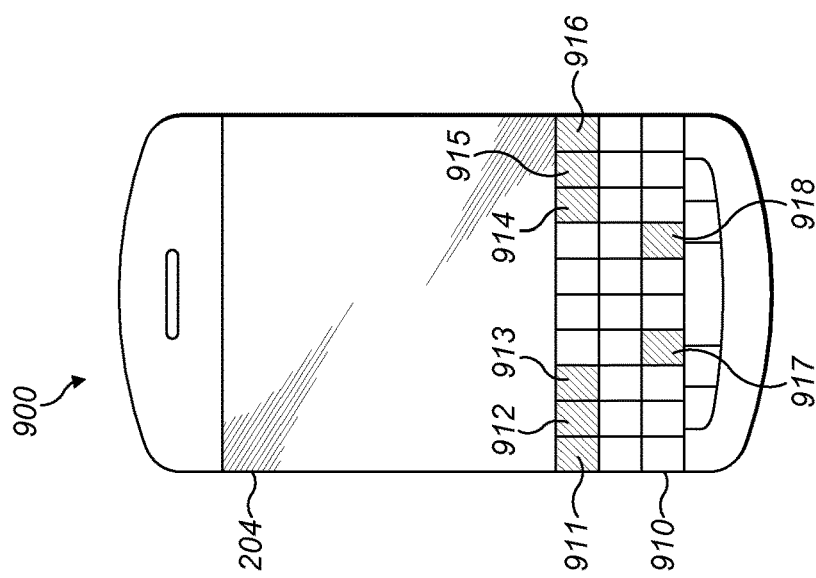

MULTI TOUCH COMBINATION FOR VIEWING SENSITIVE INFORMATION

FIELD OF THE TECHNOLOGY

The present disclosure relates to electronic devices, methods of operation thereof, and computer software for facilitating user control the device. In particular, the present disclosure provides ways of transmitting and securely viewing sensitive information.

BACKGROUND

As the speed and reach of communication networks have grown, and as the tools people use to interact have become more accessible, information can now be shared and spread faster than ever before.

For example, if a user wanted to show the contents of a sensitive document to a colleague, instead of presenting a hard copy in person, the user could send a digital copy remotely using a number of platforms, such as email and phone messages.

It is known to add an expiration timer to sensitive documents so that once received or displayed, the document will automatically be deleted, ensuring that there is no remnant copy on the receiving device for later displaying or copying.

BRIEF DESCRIPTION OF DRAWINGS

Examples of the present proposed approach will now be described in detail with reference to the accompanying drawings, in which:

FIGS. 7A, 7B and 7C illustrate a number of static touch patterns that may be used to display received data;

FIGS. 9A, 9B and 9C illustrate a number of ways of displaying received data through touch patterns involving hardware keys;

DETAILED DESCRIPTION

Figure 1:
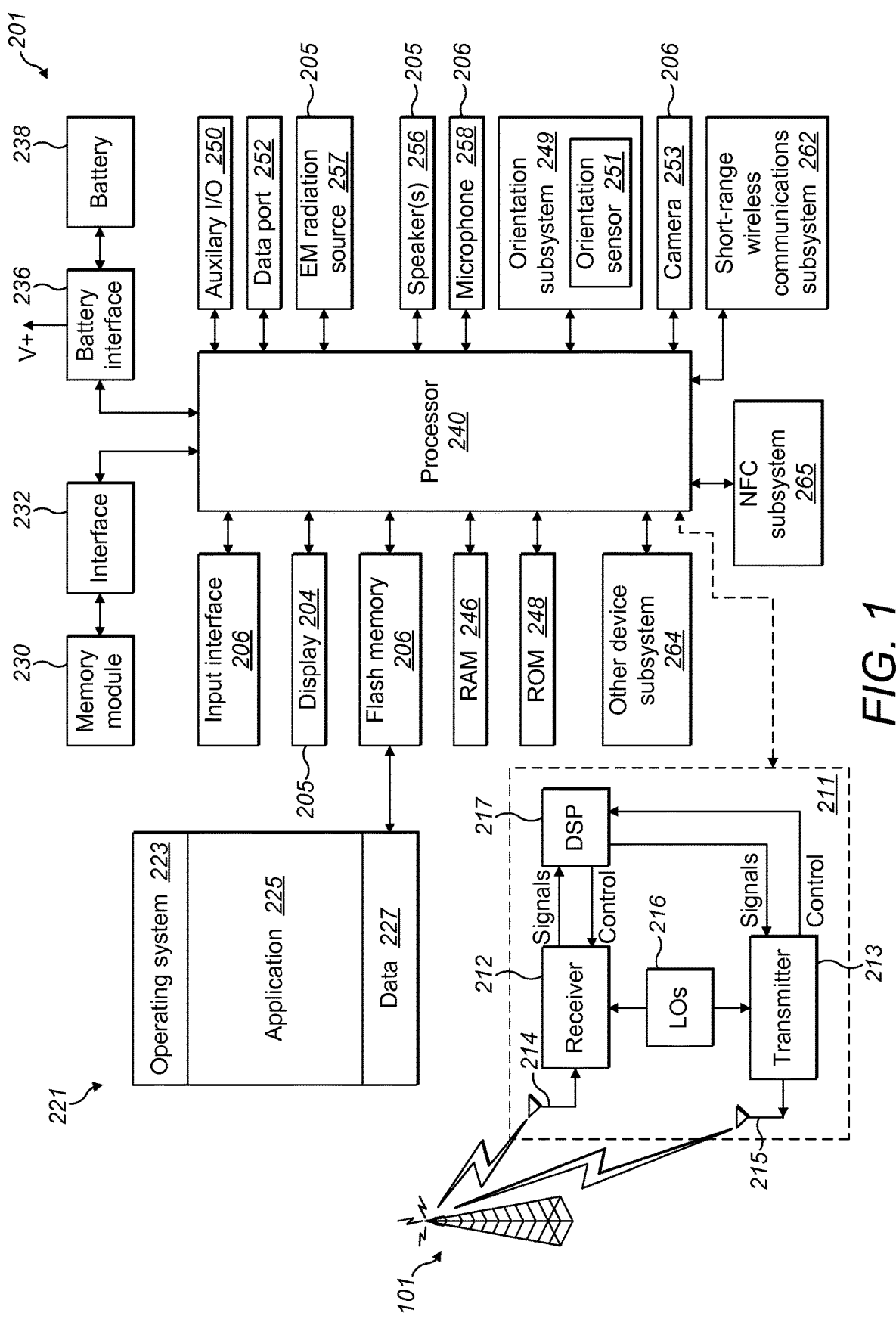
FIG. 1 is a block diagram illustrating an electronic device in accordance with example embodiments of the present disclosure.

In one embodiment, the present disclosure provides a method, at an electronic device including a user input device, the method comprising: receiving data comprising displayable content and data indicating that touch events corresponding to a pattern of multiple touches are to be detected for displaying the displayable content; upon detecting touch events corresponding to the pattern of multiple touches, displaying the displayable content; and ceasing to display the displayable content once the touch events corresponding to the pattern of multiple touches are no longer detected.

There are substantial benefits to a more connected society, where users can readily share data with one another. However, with this improved connectivity, the ease with which data can be copied and shared has made it difficult to control the availability of sensitive information. For example, if a digital copy of a document is sent to a user, the sender normally has very little control over how the receiving user interacts with the content, and whether that document subsequently gets sent on to someone else.

The solution provided herein displays content upon detecting of a pattern of multiple touches, and as a result the receiving user is less able to perform tasks other than viewing the content being displayed. For example, the user may be unable to take a screenshot of the device while performing the pattern of multiple touches, and would be unable to operate a camera or other recording instrument. Once the touch pattern ceases to be detected, the content ceases to be displayed, so that the user must continue providing the required touch pattern in order to view the content. Furthermore, requiring a touch pattern may provide the content with a form of touch authentication, particularly if the pattern of multiple touches is treated as a password.

In some example embodiments the indicating data indicates one of a plurality of patterns of multiple touches stored on the electronic device. By storing the pattern of multiple touches on the electronic device, the amount of data required to be sent is reduced, as the device need only receive an indication of which stored pattern to use, rather than receiving more detailed data describing the pattern.

In some example embodiments the indicating data indicates a complexity of the pattern of multiple touches.

In some example embodiments the indicating data comprises details of the pattern of multiple touches.

In some example embodiments, displaying the displayable content triggers a timer, and an expiration of the timer causes the electronic device to remove the displayable content from the electronic device. By utilising a counting down timer, the security of the displayed content is improved as there is less time for the user to find a way of circumventing the protection.

In some example embodiments the received data further comprises an indication of a duration of the timer.

In some example embodiments the method further comprises displaying the pattern of multiple touches. The required pattern may be displayed on the screen to aid the user in entering the required pattern.

In some example embodiments the method further comprises indicating when the detected touch events do not match the pattern of multiple touches. Providing feedback of an incorrectly touch pattern can be useful for aiding the user to enter to correct pattern.

In some example embodiments the pattern of multiple touches corresponds to individual touches detected at multiple locations on the electronic device. By requiring individual touches to be detected at multiple locations, it helps ensure that the users fingers are fully occupied and placed firmly on the screen of the electronic device, preventing any misuse of the content.

In some example embodiments the pattern of multiple touches corresponds to one or more touches moving over different locations on the electronic device. By requiring a moving touch, the user is able to see more of the content, as no one spot will be covered by the user's finger, and also inhibits the user's ability to misuse the content as they are preoccupied with continuing the required movement.

In some example embodiments the displayable content is an image, or a video, or a text, or any combination thereof.

In some example embodiments the displayable content is displayed on a display of the electronic device, and wherein the display and the user input device operate together as a touch-sensitive display.

In some example embodiments the user input device comprises one or more of the following: a touch-sensitive display, one or more hardware buttons, and a touch-sensitive panel.

In another embodiment, the present disclosure provides an electronic device including a user input device; one or more processors; and memory comprising instructions which when executed by one or more of the processors cause the electronic device to perform any of the steps described above.

In yet another embodiment, the present disclosure provides one or more computer readable medium comprising instructions, which when executed by one or more of the processors of an electronic device having a user input device, cause the electronic device to perform any of the steps described above.

Reference will now be made to FIG. 1 which illustrates an electronic device 201 in which example embodiments described in the present disclosure can be applied.

In the illustrated example embodiment, the electronic device 201 is a communication device and, more particularly, is a mobile communication device having data and optionally voice communication capabilities, and the capability to communicate with other computer systems; for example, via the Internet.

Depending on the functionality provided by the electronic device 201, in various example embodiments the electronic device 201 may be a multiple-mode communication device configured for both data and voice communication, a mobile telephone such as a cellular phone, a wearable computer such as a watch, a tablet computer such as a slate computer, a personal digital assistant (PDA), or a computer system. The electronic device 201 may take other forms apart from those specifically listed above. The electronic device may also be referred to as a mobile communications device, a communication device, a mobile device and, in some cases, as a device.

The electronic device 201 includes a controller including one or more processors 240 (such as a microprocessor) which controls the overall operation of the electronic device 201. The processor 240 interacts with device subsystems such as a wireless communication subsystem 211 for exchanging radio frequency signals with a wireless network 101 to perform communication functions. The processor 240 is communicably coupled with additional device subsystems which may include any of the following or any combination thereof: one or more output interfaces 205 (such as a display 204 and/or a speaker 256 and/or electromagnetic (EM) radiation source 257), one or more input interfaces 206 (such as a camera 253, microphone 258, keyboard (not shown), control buttons (not shown), a navigational input device (not shown), and/or a touch-sensitive overlay (not shown)) associated with a touchscreen display 204, an orientation subsystem 249, memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), a near field communications (NFC) subsystem 265, a short-range communication subsystem 262 and other device subsystems generally designated as 264. Some of the subsystems shown in FIG. 1 perform communication-related functions, whereas other subsystems may provide "resident" or on-device functions.

In at least some example embodiments, the electronic device 201 may include a touchscreen display which acts as both an input interface 206 (i.e. touch-sensitive overlay) and an output interface 205 (i.e. display). The touchscreen display may be constructed using a touch-sensitive input surface which is connected to an electronic controller and which overlays the display 204. The touch-sensitive overlay and the electronic controller provide a touch-sensitive input interface 206 and the processor 240 interacts with the touch-sensitive overlay via the electronic controller. A touch-sensitive input need not be limited to detecting the touches of fingers, as they may be responsive to any means of touching, such as a stylus or a glove.

As noted above, in some example embodiments, the electronic device 201 may include a communication subsystem 211 which allows the electronic device 201 to communicate over a wireless network 101. The communication subsystem 211 includes a receiver 212, a transmitter 213, and associated components, such as one or more antenna elements 214 and 215, local oscillators (LOs) 216, and a processing module such as a digital signal processor (DSP) 217. The antenna elements 214 and 215 may be embedded or internal to the electronic device 201 and a single antenna may be shared by both receiver and transmitter. The particular design of the wireless communication subsystem 211 depends on the wireless network 101 in which electronic device 201 is intended to operate. The wireless network 101 may, for example, be a cellular (such as GSM, GPRS, CDMA and EDGE) and/or a non-cellular network (for example local WiFi networks).

In at least some example embodiments, the electronic device 201 may communicate with any one of a plurality of fixed transceiver base stations of the wireless network 101 within its geographic coverage area. The electronic device 201 may send and receive communication signals over the wireless network 101 after the required network registration or activation procedures have been completed. Signals received by the antenna 214 through the wireless network 101 are input to the receiver 212, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 217. In a similar manner, signals to be transmitted are processed, including modulation and encoding, for example, by the DSP 217. These DSP-processed signals are input to the transmitter 213 for digital-to-analog (D/A) conversion, frequency up conversion, filtering, amplification, and transmission to the wireless network 101 via the antenna 215. The DSP 217 not only processes communication signals, but may also provide for receiver and transmitter control. For example, the gains applied to communication signals in the receiver 212 and the transmitter 213 may be adaptively controlled through automatic gain control algorithms implemented in the DSP 217.

In some example embodiments, the auxiliary input/output (I/O) subsystems 250 may include an external communication link or interface; for example, an ethernet connection. The electronic device 201 may include other wireless communication interfaces for communicating with other types of wireless networks; for example, a wireless network such as an orthogonal frequency division multiplexed (OFDM) network. The auxiliary I/O subsystems 250 may include a vibrator for providing vibratory notifications in response to various events on the electronic device 201 such as receipt of an electronic communication or incoming phone call, or for other purposes such as haptic feedback (touch feedback).

In some example embodiments, the electronic device 201 also includes a removable memory module 230 (typically including flash memory, such as a removable memory card) and a memory interface 232. Network access may be associated with a subscriber or user of the electronic device 201 via the memory module 230, which may comprise a Subscriber Identity Module (SIM) card for use in a GSM network or other type of memory card for use in the relevant wireless network type. The memory module 230 is inserted in or connected to the memory card interface 232 of the electronic device 201 in order to operate in conjunction with the wireless network 101.

In at least some example embodiments, the electronic device 201 also includes a device orientation subsystem 249 including at least one orientation sensor 251 which is connected to the processor 240 and which is controlled by one or a combination of a monitoring circuit and operating software. The orientation sensor 251 detects the orientation of the device 201 or information from which the orientation of the device 201 can be determined, such as acceleration. In some example embodiments, the orientation sensor 251 comprises an accelerometer, such as a three-axis accelerometer. An accelerometer generally comprises a sensor which converts acceleration from motion (e.g. movement of the device 201 or a portion thereof due to the strike force) and gravity which are detected by a sensing element into an electrical signal (producing a corresponding change in output). Accelerometers may be available in one, two or three axis configurations. Higher order axis configurations are also possible. Accelerometers may produce digital or analog output signals depending on the type of accelerometer.

An orientation sensor 251 may generate orientation data which specifies the orientation of the electronic device 201. The orientation data, in at least some example embodiments, specifies the orientation of the device 201 relative to the gravitational field of the earth.

In some example embodiments, the orientation subsystem 249 may include other orientation sensors 251, instead of or in addition to accelerometers. For example, in various example embodiments, the orientation subsystem 249 may include a gravity sensor, a gyroscope, a tilt sensor, an electronic compass or other suitable sensor, or combinations thereof. In some example embodiments, the device orientation subsystem 249 may include two or more orientation sensors 251 such as an accelerometer and an electronic compass.

The electronic device 201 may also include a battery 238 as a power source, which is typically one or more rechargeable batteries that may be charged for example, through charging circuitry coupled to a battery interface 236 such as the data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The electronic device 201 stores data 227 in an erasable persistent memory, which in one example embodiment is the flash memory 244. In various example embodiments, the data 227 includes service data including information required by the electronic device 201 to establish and maintain communication with the wireless network 101. The data 227 may also include user application data such as messages, address book and contact information, calendar and schedule information, notepad documents, image files, and other commonly stored user information stored on the electronic device 201 by its user, and other data. The data 227 stored in the persistent memory (e.g. flash memory 244) of the electronic device 201 may be organized, at least partially, into one or more databases or data stores. The databases or data stores may contain data items of the same data type or associated with the same application. For example, messages, contact records, and task items may be stored in individual databases within the device memory.

The electronic device 201 may, in some example embodiments, be a mobile communication device which may provide two principal modes of communication: a data communication mode and a voice communication mode. In the data communication mode, a received data signal such as a message, or Web page download will be processed by the communication subsystem 211 and input to the processor 240 for further processing. For example, a downloaded Web page may be further processed by a browser application or an email message may be processed by an email messaging application and output to the display 204. A user of the electronic device 201 may also compose data items, such as email messages, instant messages, or other messages; for example, using the input devices in conjunction with the display 204. These composed items may be transmitted through the communication subsystem 211 over the wireless network 101.

In the voice communication mode, the electronic device 201 provides telephony functions and may operate as a cellular phone. The overall operation is similar, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input interfaces 206). Alternative voice or audio I/O subsystems, such as a voice message recording subsystem, may also be implemented on the electronic device 201. Although voice or audio signal output is typically accomplished primarily through the speaker 256, the display screen 204 may also be used to provide an indication of the identity of a calling party, duration of a voice call, or other voice call related information.

The processor 240 operates under stored program control and executes software modules 221 stored in memory such as persistent memory; for example, in the flash memory 244. As illustrated in FIG. 1, the software modules 221 include operating system software 223 and other software applications 225 such a user interface (UI) module. In the example embodiment of FIG. 1, the UI module is implemented as a stand-alone application 225. However, in other example embodiments, the UI module could be implemented as part of the operating system 223 or another application 225 or collection of applications.

Figure 2:
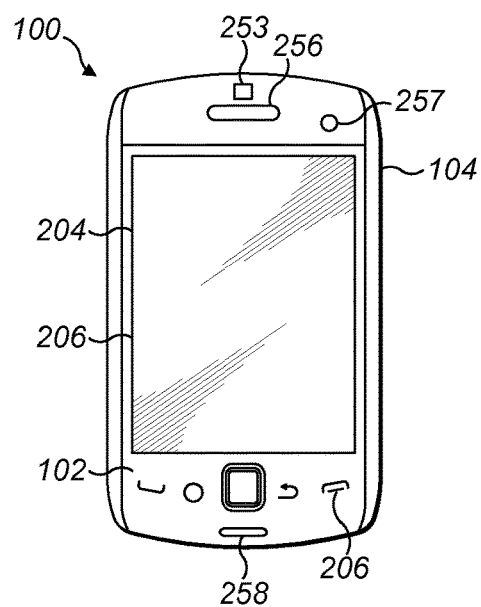
FIG. 2 is a front view of a phone in accordance with example embodiments of the present disclosure.

Referring now to FIG. 2, the electronic device 201 may be a cellular (or mobile) phone 100. For example, the phone 100 may have the ability to run third party applications which are stored on the phone.

The phone 100 may include the components discussed above with reference to FIG. 1 or a subset of those components. The phone 100 includes a housing 104 which houses at least some of the components discussed above with reference to FIG. 1.

In the example embodiment illustrated, the phone includes a display 204, which may comprise a touchscreen display which acts as an input interface 206. The display 204 is disposed within the phone 100 so that it is viewable at a front side 102 of the phone 100. That is, a viewable side of the display 204 is disposed on the front side 102 of the phone. In the example embodiment illustrated, the display 204 is framed by the housing 104.

The example phone 100 may also include other input interfaces 206 such as one or more buttons, keys or navigational input mechanisms. In the example illustrated, at least some of these additional input interfaces 206 are disposed for actuation at a front side 102 of the phone.

Figure 3:
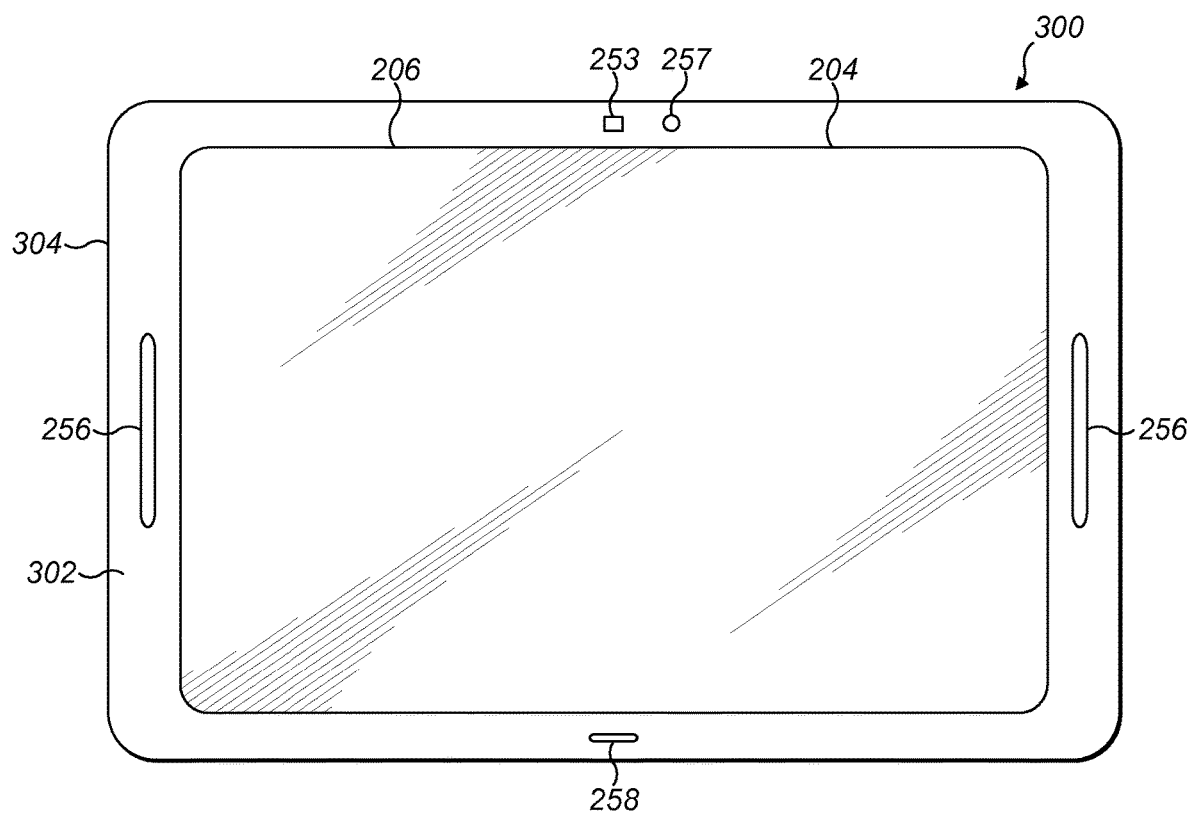
FIG. 3 is a front view of a tablet computer in accordance with example embodiments of the present disclosure.

Referring now to FIG. 3, a front view of another example of an electronic device 201, a tablet computer 300, is illustrated. The tablet computer 300 may include many of the same features and components of the phone 100 of FIG. 2. However, the tablet computer 300 of FIG. 3 is generally larger than the phone 100. The tablet computer 300 may include the components discussed above with reference to FIG. 1 or a subset of those components. The tablet computer 300 includes a housing 304 which houses at least some of the components discussed above with reference to FIG. 1. The tablet computer 300 could support cellular wireless communication and/or non-cellular wireless communication.

The tablet computer 300 includes a display 204, which may comprise a touchscreen display which acts as an input interface 206. The display 204 is disposed within the tablet computer 300 so that it is viewable at a front side 302 of the tablet computer 300. That is, a viewable side of the display 204 is disposed on the front side 302 of the tablet computer 300. In the example embodiment illustrated, the display 204 is framed by the housing 304.

Figure 4:
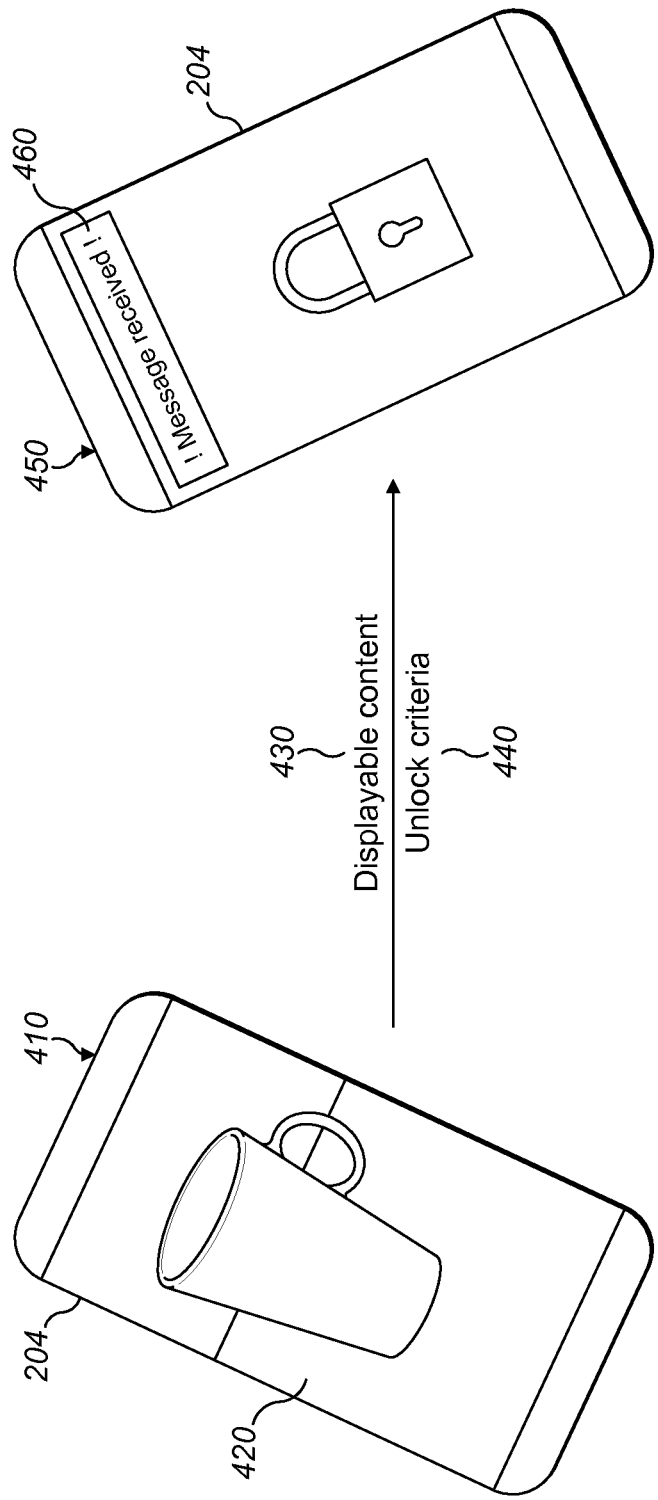
FIG. 4 shows a first electronic device transmitting sensitive information to a second electronic device.

Reference will now be made to FIG. 4 which illustrates a first electronic device 410 communicating with a second electronic device 450, wherein the first device 410 is attempting to send an image 420 to the second device 450. The image 420 that the first device 410 is attempting to send may be any displayable content, such as a digital photo the device has just taken, an image or video stored on the device, a text message, or any combination of media.

In business scenarios, the image 420 may be a photograph of a confidential prototype or it may be a sensitive memo that must not be leaked to the public or to rival companies, for example. The proposed system is also applicable to personal use, where a user wishes to send personal messages or media to a friend or relative that they wish to remain secret. While the use of the proposed system is not restricted to transmission of sensitive or confidential information, the advantages of the system in some example embodiments may be particularly useful to such information.

Once a sending user has previewed the image 420 on the screen 204 of the first device 410, the device may transmit the image 420 to the receiving device 450. This transmission may be via a direct communication, for example NFC and/or Bluetooth, or over a network such as a cellular and/or Wi-Fi network. The transmission may contain the displayable content 430 and metadata 440 concerning how the content should be viewed on the receiving device. The metadata 440 may indicate to the receiving device that the displayable content 430 transmitted is sensitive information and so should be locked by default unless certain unlock criteria have been met. The transmission of displayable content 430 and metadata 440 may be sent within the same transmission, or may be sent separately and via different communication channels. In some embodiments, one or more of the displayable content 430 may be encrypted, so that even when received and stored at the receiving device 450, the displayable data cannot be displayed without the correct credentials.

On receiving the displayable content 430 and metadata 440, the receiving device 450 may notify the user that a message has been received by displaying a notification 460 on the screen 204. Other types of notifications may be provided, such as haptic and audio notifications. From the metadata 440, the receiving device 450 does not display the displayable content 430 unless certain unlocking criteria have been met first.

In some systems, when sensitive information has been received, the sensitive data may only be displayed for a fixed timespan, for example a few seconds, before ceasing to be displayed and even deleted. These self-destructing messages can be useful, as they ensure that once a receiving user has viewed the message, they should not be able to show the same message at a later point to another user. One problem with such systems, is that most electronic devices provide ways of recording what is displayed on the display, such that even if the original message is deleted, the recipient may still have made a copy.

Figure 5C:
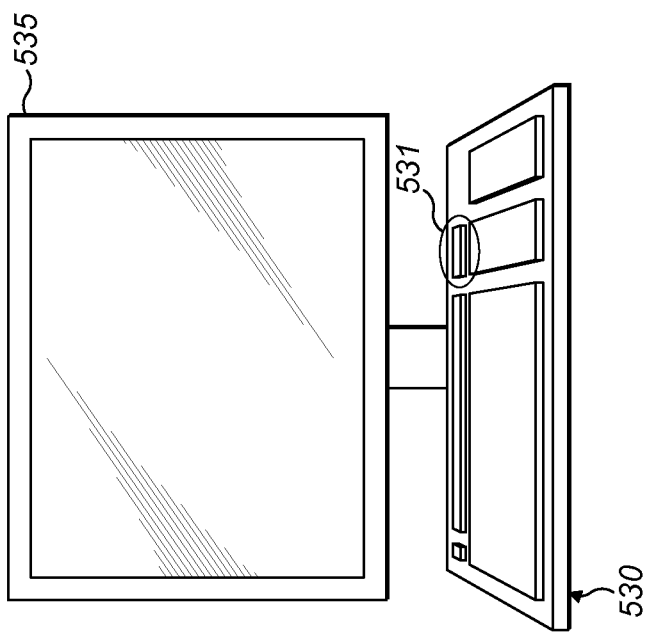
FIGS. 5A, 5B, and 5C illustrate a number of ways of taking screenshots on different electronic devices.
Figure 5B:
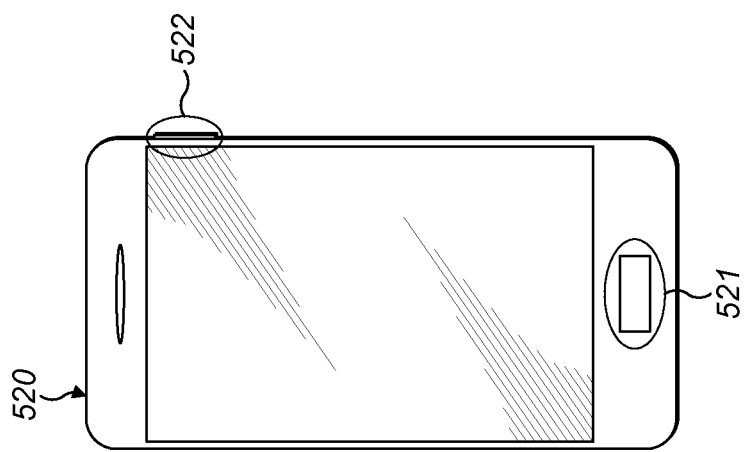
Figure 5A:
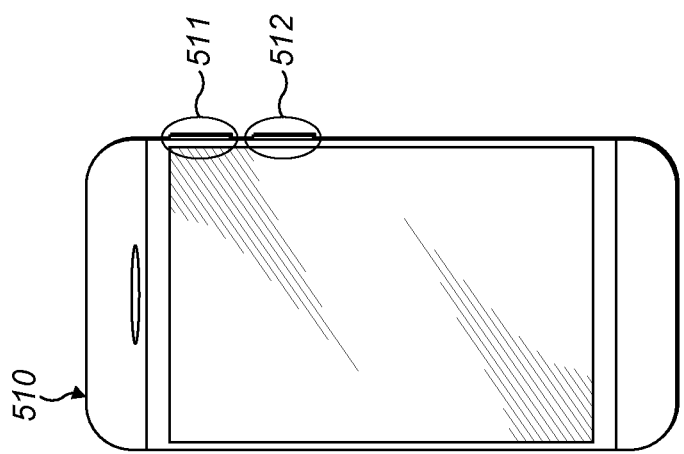

FIGS. 5A, 5B and 5C illustrate a number of ways in which a receiving device may make a copy of a received message, even if the message is programmed to self-destruct. At the example portable electronic device 510 in FIG. 5A, two hardware buttons that are normally used for volume control may be pressed together to take a screenshot (also referred to as a screen capture, screencap, screen grab, or print screen) of the display. As screenshot functionality is often provided by the operating system, it can be difficult to prevent such an operation from within software, as the software may not be authorised to interfere the underlying operating system's behaviour. Another example electronic device 520 of FIG. 5B may have a power button 522 and a 'home' button 521 which, when pressed together, trigger a screenshot of the device 520. The buttons may be tactile hardware keys, or dedicated capacitive touch regions of the device, for example. Screenshots can be taken by most devices that have, or are connected to, displays. For example, in a laptop or desktop computer 535 of FIG. 5C, the keyboard 530 often includes one or more keys dedicated for taking screenshots (e.g. the "print screen" button). Pressing such a button will copy anything that is displayed on the monitor or monitors to the computer's clipboard. With screenshot functionality provided with so many electronic devices, even if a message is set to self-destruct on viewing, it would still be possible to take a quick screenshot before the message disappears.

There may be ways of inhibiting the device's ability to take an accurate screenshot, such as flickering the display so that only a portion of the image is ever displayed at one time while still providing the illusion of a full image to the user, or by adding software that attempts to interfere with the operating system's ability to take a screenshot. However, a better way of preventing screenshots is to ensure that the user cannot even attempt to take a screenshot in the first place.

Figure 6B:
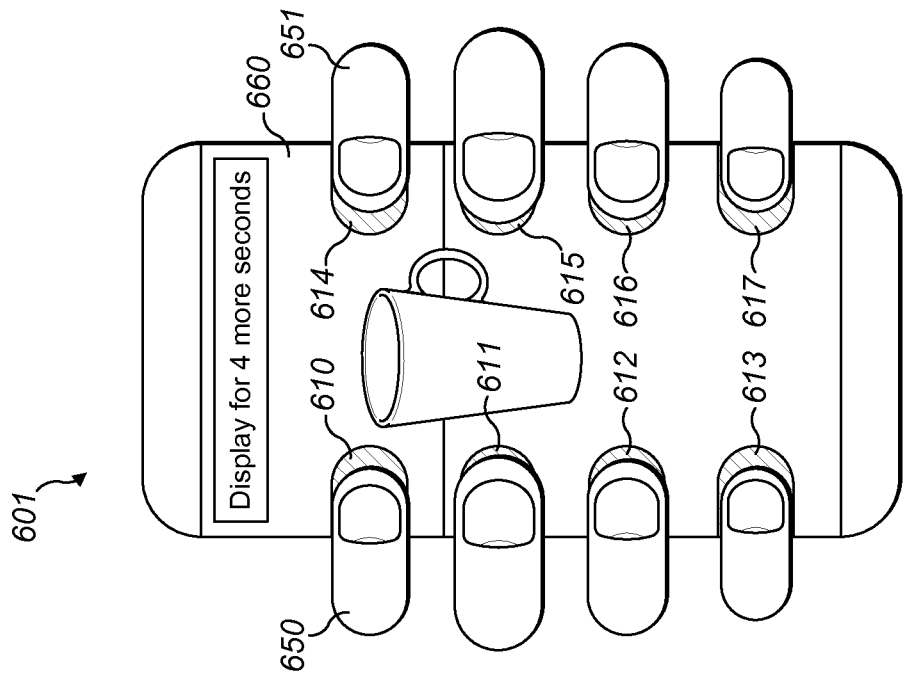
FIGS. 6A and 6B illustrate an electronic device in accordance with an embodiment showing multiple touches being used to display received data.
Figure 6A:
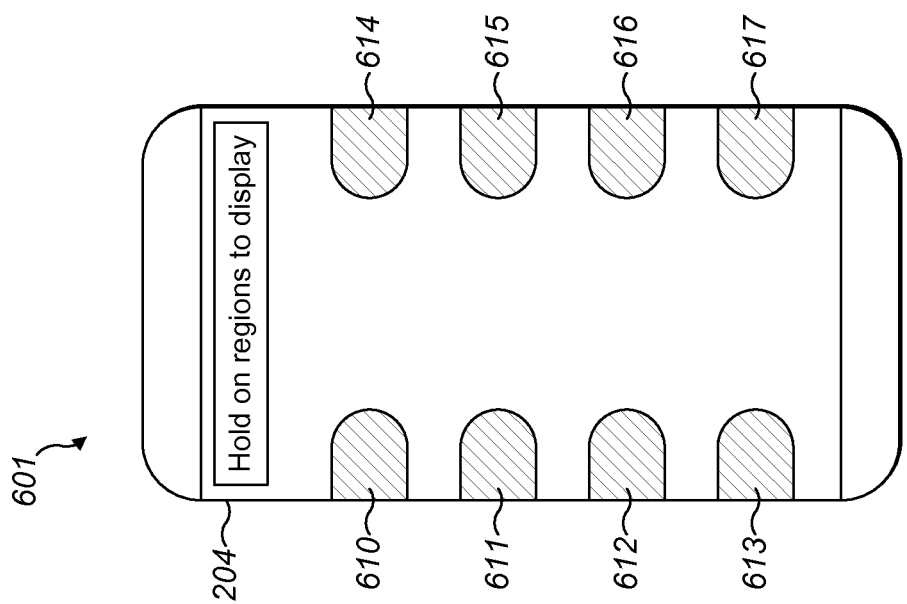

FIGS. 6A and 6B illustrate one example way for a receiving device to display sensitive data, while at the same time inhibiting the ability to capture a screenshot. As shown in FIG. 6A, the device 601 has received displayable content and is providing the user the opportunity to unlock the received content. The screen 204 displays or otherwise provides an instruction informing the user to press and hold on certain highlighted regions 610, 611, 612, 613, 614, 615, 616, and 617 to display the content. These eight highlighted regions 610, 611, 612, 613, 614, 615, 616, and 617 are displayed around the screen 204, showing the user where to place his or her fingers. In FIG. 6B, the user is touching each of regions 610, 611, 612, and 613, such as with the fingers of one hand 650, and regions 614, 615, 616, and 617, such as with fingers of the other hand 651. When the device 601 detects that all eight regions 610, 611, 612, 613, 614, 615, 616, and 617 are being touched, the device may display on the screen the content 660 for the user to view. If the user removes any one of their fingers then the device will automatically stop displaying the content 660.

As shown in FIG. 6B, while the user is placing eight fingers on the positions indicated on the screen, it would be difficult for the user to also press on the key combination required to take a screenshot (such as using device 510 or 520 of FIG. 5). If the user removes one of his or her fingers to reach one of the keys for the screenshot, the device automatically ceases displaying the content 660 so that there will be no content displayed by the time the user reaches the screenshot keys. In this way, the proposed solution provides a way of displaying content while substantially inhibiting the ability to take a screenshot of the content while it is displayed.

FIGS. 6A and 6B showed one example touch pattern that would inhibit a user's ability to take a screenshot. However, there are various other patterns that may be used with varying levels of effectiveness. FIGS. 7A, 7B, and 7C illustrate examples of static touch patterns that can be used to inhibit capturing a screenshot. Example device 700 of FIG. 7A displays only two touch regions, 701 and 702, to touch. This could be effective if the user is supporting the back of device 700 with the user's fingers and placing the user's thumbs on the two touch regions 701 and 702. In such a position it would be difficult to move the user's fingers to screenshot keys without dropping the phone. The touch regions 701 and 702 may be relatively large so that thumbs must be used rather than fingers.

While the touch pattern required in device 700 may inhibit the ability to take a screenshot, the user could get around it by placing the device flat on surface, thereby freeing the user's fingers to reach the screenshot keys. Like with most forms of access restrictions in technology (e.g. digital right management DRM), there may be a way to circumvent it, but the more difficult it is to get around, the less likely a user is to try. For example, although copy protection on DVDs will deter many users from making illegal copies, more determined users will find a software or hardware route to copying the media anyway. Similarly, by making it uncomfortable for the user to take a screenshot, it would deter many users but would not guarantee deterring all users. Therefore, different levels of security may be provided, where the pattern used is more efficient at inhibiting screenshot-taking than others.

Example device 710 of FIG. 7B shows a more effective pattern than in FIG. 7A, as eight fingers are required to touch the screen 204 on regions 711, 712, 713, 714, 715, 716, 717, and 718. This would make it substantially more difficult to take a screenshot on device 710 than on device 700. However, it could still be possible, as the user would have two fingers free which could theoretically be used to take a screenshot. Therefore example device 720 of FIG. 7C shows an even more secure pattern, where all ten fingers have to be placed on the screen 204 on regions 721, 722, 723, 724, 725, 726, 727, 728, 729, and 730 leaving no fingers free to perform a screenshot.

While example device 720 does provide the most secure pattern compared to example devices 710 and 700, it may also be the most inconvenient for the receiving user, requiring that the user support the device 720 on a flat surface while holding down their fingers. The choice of pattern used is therefore a compromise between how well it inhibits unwanted behaviour while not making it too uncomfortable for legitimate users. Therefore, with highly sensitive information it may be justified to use the pattern of device 720, whereas for less sensitive information or information being shared with a more trustworthy recipient, a simpler pattern like the pattern of device 700 may be more appropriate.

While FIGS. 7A, 7B, and 7C illustrated a number of static patterns, where the user holds down on certain fixed touch regions, the patterns may also be dynamic ones that move. FIGS. 8A, 8B, 8C, 8D, 8E, and 8F illustrate a number of examples of dynamic patterns that could be used.

Figure 8C:
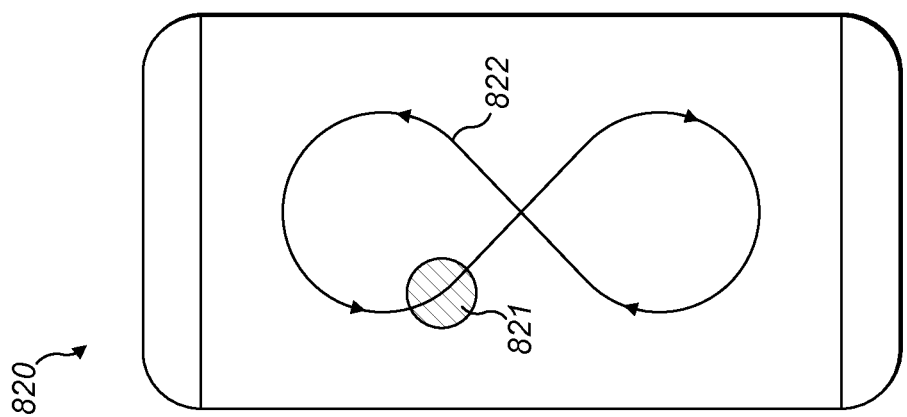
FIGS. 8A, 8B, 8C, 8D, 8E and 8F illustrate a number of dynamic touch patterns that may be used to display received data.
Figure 8B:
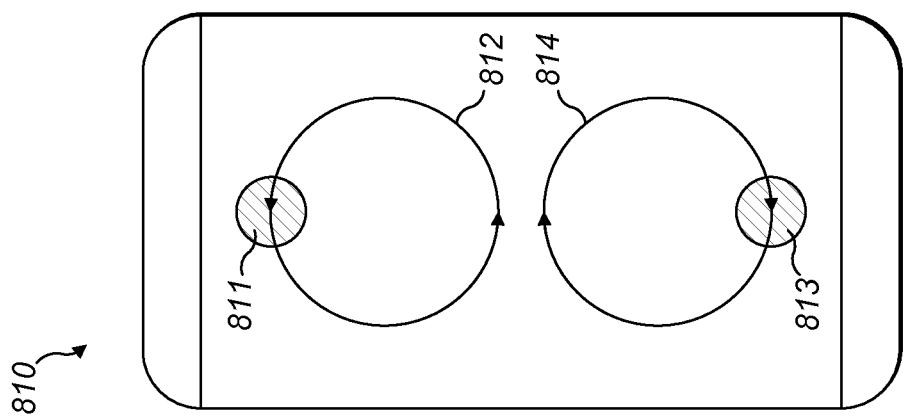
Figure 8A:
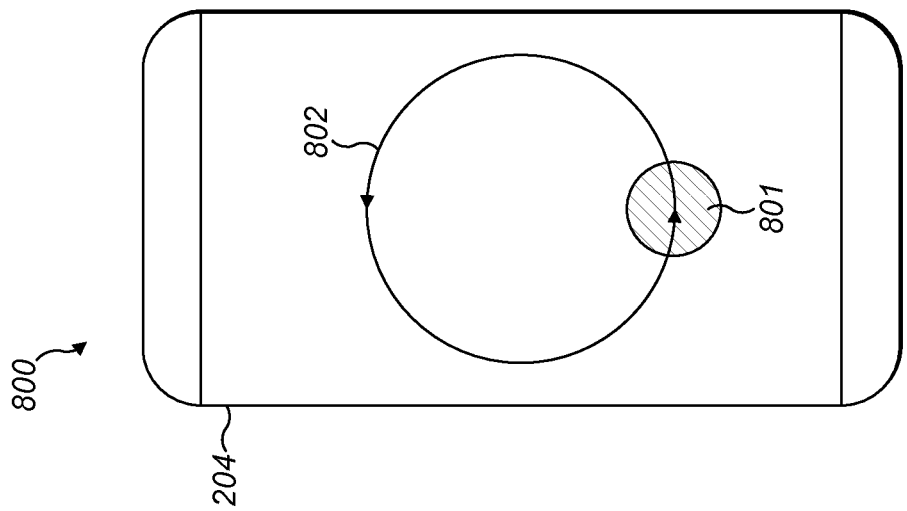

Example device 800 of FIG. 8A shows that a touch region 801 that could be moved in a continuous circle to trigger display of the content, and when the movement stops or deviates from the expected path, the content stops being displayed. While a user is supplying a continuous movement to the screen 204, it would be difficult for the user to position their fingers in position to press the screenshot button. The moving touch may also be beneficial over static touch patterns as it means that the user's finger is not always obscuring the same part of the displayed content.

Figure 8F:
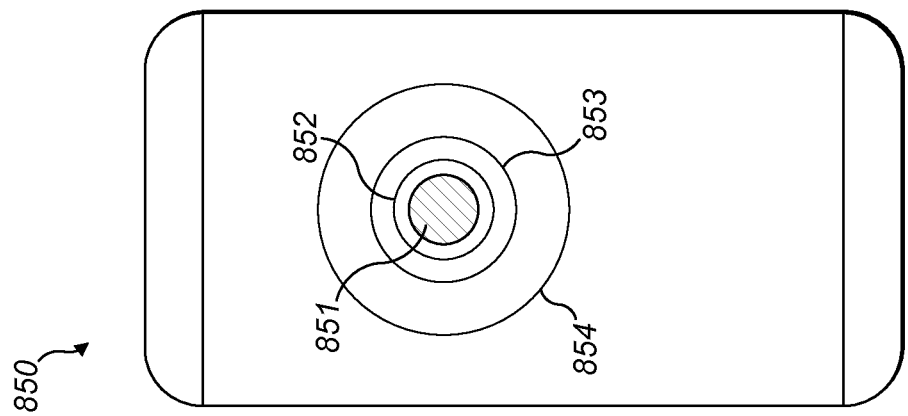

A more secure dynamic pattern is illustrated in FIG. 8B which shows device 810 and two touch regions (811 and 813) must be detected circling in opposite directions (812 and 813) to display the content. This would most likely mean that fingers of two hands are performing the movement, thereby leaving no hands free to perform a screenshot. Another example dynamic pattern as shown in FIG. 8C with device 820 is a touch region 821 moving in a figure eight 822. The more complicated a pattern is, the better it may be at restricting screenshot taking. An advantage of the figure-eight pattern is that although it is a physically more complicated pattern to perform, it is one that a user would readily understand. Example device 830 of FIG. 8D shows two touch regions (831 and 833) moving back and forth (832 and 834) near the bottom of the screen so that constant movement is required without obscuring too much of the screen. A further example may be a repeated pinch (bringing two fingers together) and punch (bringing those two fingers apart) gesture.

Figure 8E:
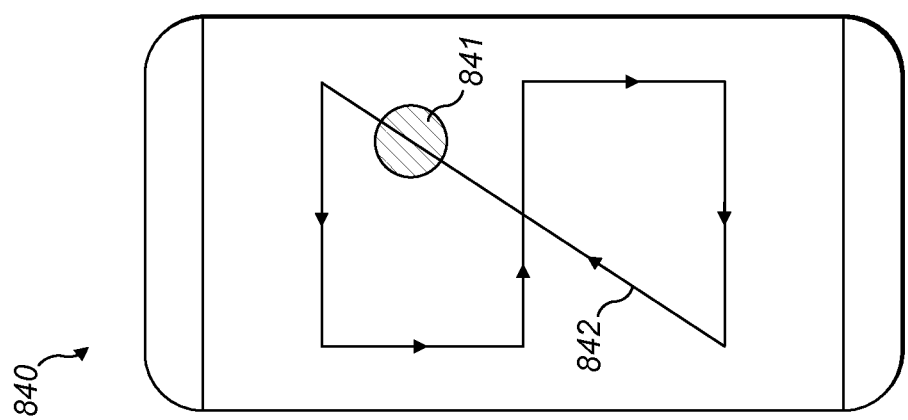
Figure 8D:
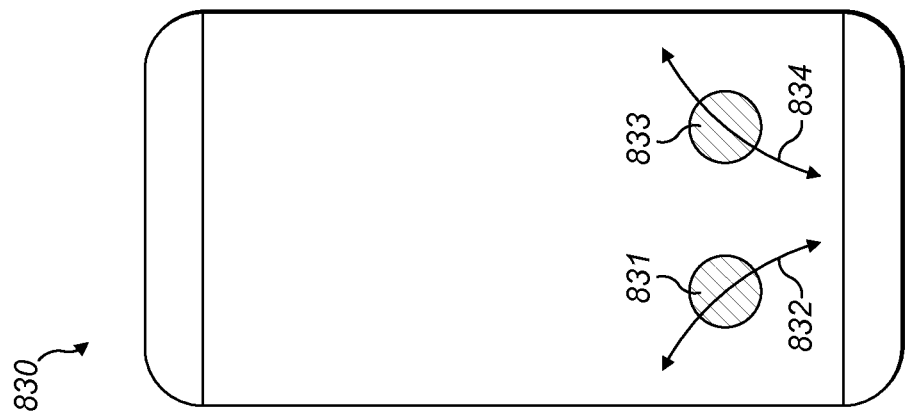

More complicated patterns can be used, like in example device 840 of FIG. 8E, where a touch region 841 must follow a complicated path 842 to allow content to be displayed. Complicated patterns such as the one shown in FIG. 8E are not only physically harder to perform, but also require more of the user's concentration, making it harder for them to find a way of taking the screenshot.

Dynamic patterns need not be restricted to the movement of touches across the screen, but could be rhythmic patterns on the same point on the screen. Example device 850 in FIG. 8F shows a touch region 851 being repeated three times (852, 853, and 854) in a tapping motion at a certain rhythm. Such a rhythm may be a fixed tempo, a changing tempo, Morse code, or the rhythm to a tune, for example. As long as the continued tapping is maintained the content will be displayed, but if one or more taps are missed, then the device may stop displaying the content.

The proposed solutions are not limited to touch-based user input, and FIGS. 9A, 9B, and 9C provide a number of such examples. In the example of FIG. 9A, an electronic device 900 comprises a display 204 and a physical keyboard 910. The pattern required may be for certain keys to be pressed and held concurrently, for example, keys 911, 912, 913, 914, 915, 916, 917, and 918. The required keys may be distributed such that it would not be possible for a user to hold multiple keys with the same finger, thus requiring more of the user's fingers to be engaged with the keyboard. In this example, as long as keys 911, 912, 913, 914, 915, 916, 917, and 918 are being pressed and held, the content will display and if any of those keys cease to be displayed, the content will disappear. Furthermore, when keys other than the required keys are detected as pressed, the device may remove the content from the display, as the device may infer that the user is simply pressing down all he keys with a larger object, freeing their fingers to press the screenshot keys. Similarly, in touch-screen embodiments, an improperly placed touch input could trigger stopping the content display.

The electronic device may provide a mixture of user inputs, for example in FIG. 9B, the electronic device 920 comprises both a touch-sensitive display 204 and a physical keyboard 910. With such combined means for receiving user input, the required patterns may also make use of the different user inputs. As shown in example 920, a touch is required at region 924 and also three physical keys need to be pressed at 921, 922 and 923. By combining user inputs it ensures that the user's fingers are covering a larger area of the device 920 than if restricted to providing user input to just one of the user input means supplied.

The proposed solution need not be limited to portable electronic devices, as it would be just as applicable to any device comprising a means for receiving user input. Example device 930 of FIG. 9C shows such an embodiment where the solution is utilised at a desktop computer. In order to inhibit the user from pressing the print screen button 951 at the keyboard 950, the user is required to press a number of keyboard 950 keys at the same time. In this example, the user must press ten keyboard keys (931 to 940) concurrently so that no fingers are free to touch the print screen button while the image is displayed. Due to the problem of keyboard ghosting in some keyboards, certain combinations of keys cannot be detected together, so the required keys may be chosen so that they can all be correctly detected at the same time.

Other forms of user input may include a touch-sensitive back panel of an electronic device. Certain regions of the back panel may need to be touched, or the panel could help the device determine how the user is holding the device. For example, if the device detects that the user is holding the device, the unlock requirements may be more lenient than if the device is detected as being supported by a flat surface. A proximity sensor or camera may be used to determine how a user is interacting with the device and adjusting the complexity of the pattern accordingly. A camera could also be used to detect off-surface gestures, or may simply count that there are ten fingers displayed in front of the camera and then displaying the content. The camera may also use facial recognition so as to disable displaying the content if more than one user is detected. The device could also have a touch detector, for example around the edges of the device, to determine if the device is being squeezed or held. Other user input devices could also include touch pads, and a computer mouse, for example As different recipient devices may have different hardware, the sending device may receive information about the receiving device and modify the unlock requirements accordingly. For example, the unlock requirement may be modified to take into account a different positioning of the screenshot key(s) so as to make it harder to press. The unlock requirement may be modified according to the size of the display, for example, as certain touch combinations may not be possible on particularly large or small touch displays.

Although the above patterns have been described as being particular useful for preventing screenshots being taken, they may also inhibit other unwanted activities by the recipient. For example, occupying the recipients fingers with touch patterns would make it harder for them to take a photograph of the device, which would be an alternative to taking a screenshot. It would also prevent the recipient from initiating any other method of copying that may be available on the device.

Figure 10C:
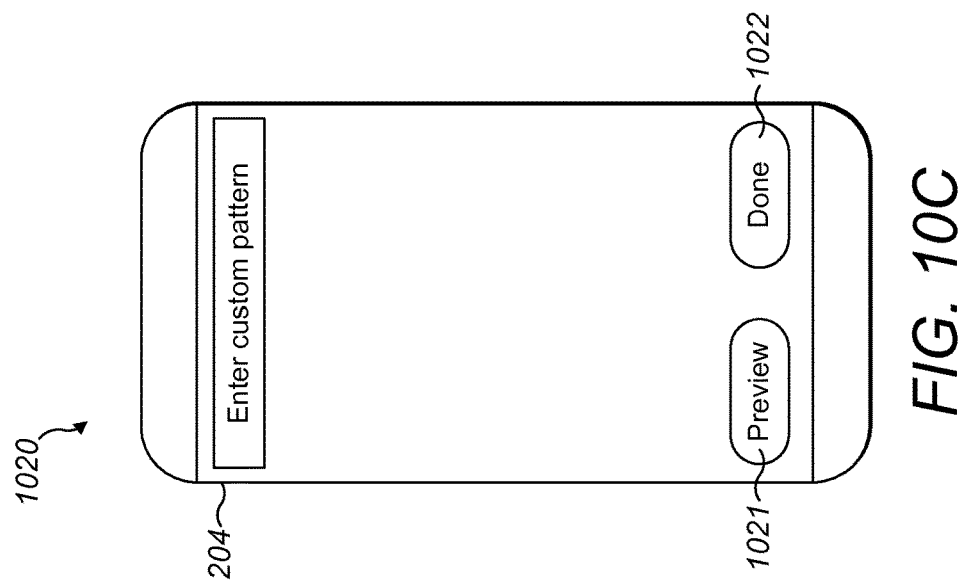
FIGS. 10A, 10B and 10C show screens that may be displayed on a sending device prior to transmitting data to another device.
Figure 10B:
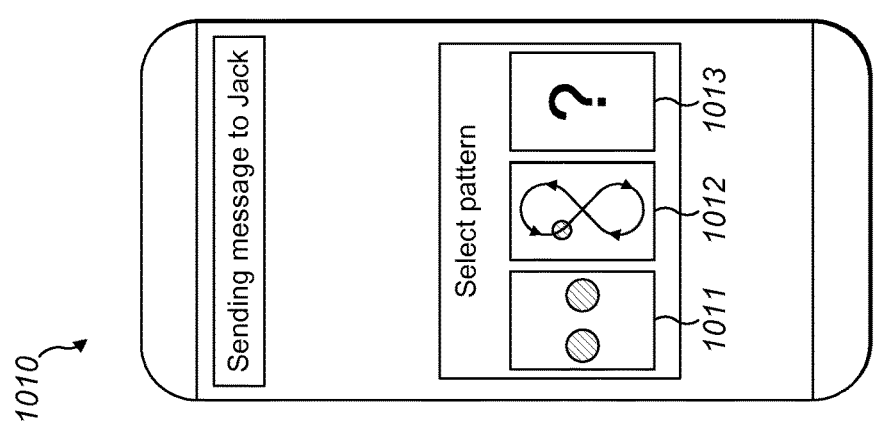
Figure 10A:
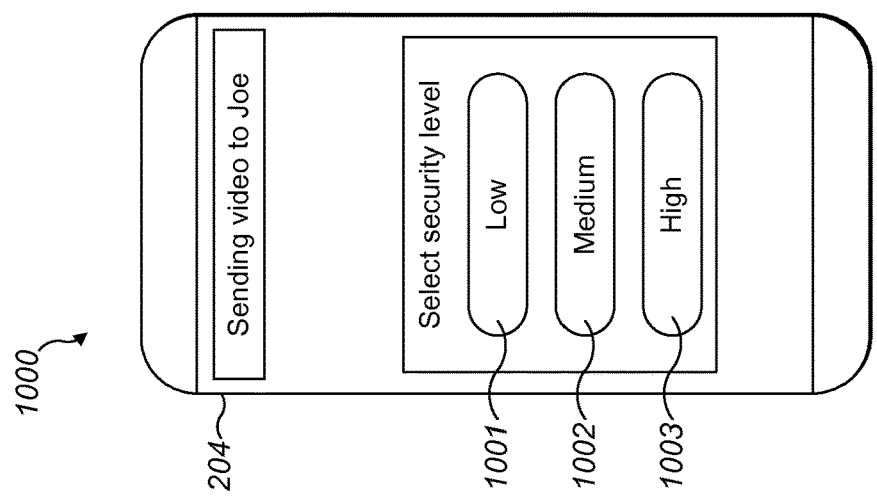

FIGS. 10A, 10B, and 100 show examples of screens that may be displayed on a sender device prior to transmitting data to the recipient device. FIG. 10A illustrates the screen 204 of a device 1000 after a video has been selected or recorded for sending. At this point the user of the sender device is prompted to choose from a choice of a plurality of security settings e.g. low 1001, medium 1002, and high 1003. The different settings will affect how secure against copying the sent message will be. For example, selecting the low option 1001 may require that the receiving user holds two fingers down, as in the pattern used with device 700 of FIG. 7A, while the high option 1003 may require that the receiving user holds down all ten fingers on the device, like in pattern used with device 720 of FIG. 7B. These options are provided to the user of the sender device so they can decide how obtrusive the anti-copy counter measure should be, as although higher security levels may be more secure, the sender may consider it inappropriate for the specific sensitivity of the message being sent. More or fewer options may be provided, and each option may always result in the same pattern, or each option may randomly select from a number of patterns of similar security levels.

Example device 1010 of FIG. 10B shows another possibility for options presented on a sender device prior to transmitting a message. Rather than selecting from a number of security levels, the user is provided actual patterns to choose from. In this example, the user is presented with a plurality of options, e.g. the first 1011 being the two-finger hold used with device 700, the second 1012 being the figure eight movement used with device 820, with the third option 1013 being the option for the user to define a custom pattern.

The screen 204 displayed at device 1020 in FIG. 100 illustrates an example of what the sending device would present upon receiving selection of the option to define a custom pattern. The screen 204 may display a blank screen and detect and store any touch input received. The screen 204 may visually respond to any touch input received to provide the user with feedback that their touch input was detected as they enter their pattern. The screen 204 may also display guiding graphics, for example a grid, to provide the user with location references when entering their custom pattern. The custom touch pattern may comprise a static pattern, a dynamic pattern, or a combination of the two. After the user has finished entering their custom pattern, they may have the option to preview 1021 it to check how it would look to the receiving user, or may select 'done' 1022 to continue sending the message with the custom pattern entered.

Once a touch pattern has been selected, such as by selecting a security level, selecting a predefined pattern, or creating a custom pattern, the content may be sent from the sending device along with metadata indicating what pattern is required by the receiving device. The metadata may transmit detailed information of the required touch pattern, for example, explicitly stating how many fingers are required, which coordinates the touches need to be detected at, and full paths and timings for dynamic patterns. One of the advantages of limiting the user's selection is that once a user picks from a choice of limited options, rather than sending detailed information in the metadata, the metadata may simply be an indicator of which option was selected. This indicator may be as small as a single byte of information indicating the number of the option selected, so that the receiving device can match that number with its own stored set of patterns. The metadata may be incorporated into the content data itself when transmitted.

Figure 11C:
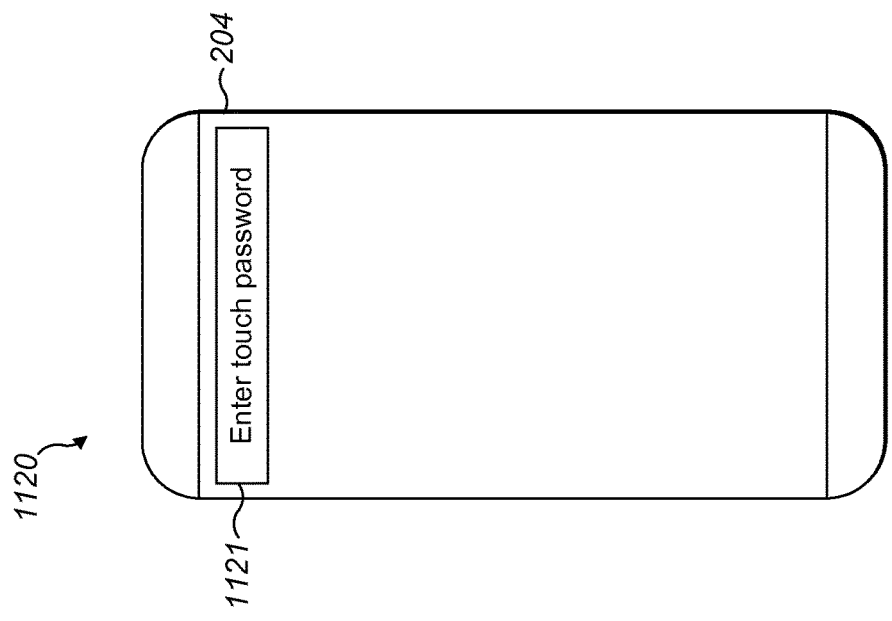
FIGS. 11A, 11B and 11C show screens that may be displayed on a receiving device prior to displaying received data on the device.
Figure 11B:
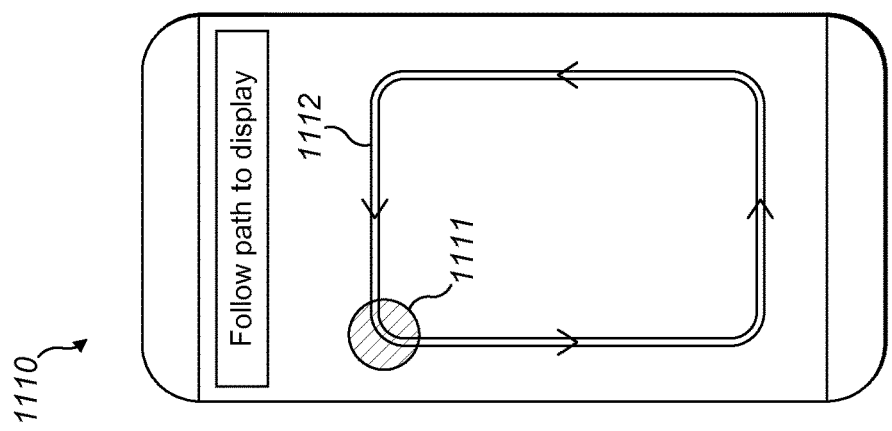
Figure 11A:
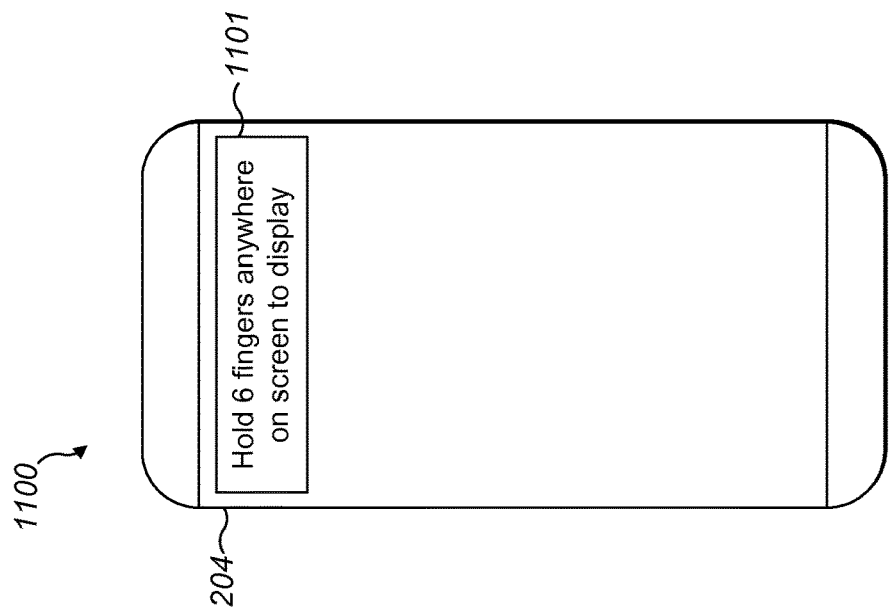

FIGS. 11A, 11B, and 11C show examples of screens that may be displayed on a receiving device prior to displaying the content. The screen that is displayed to the receiving user will depend at least partially on the metadata sent by the sending device, as that will indicate the requirements for the receiving device to display the content. In the example of FIG. 11A, the receiving device 1100 displays the instruction: "Hold 6 fingers anywhere on screen to display" 1101. In this scenario, the metadata indicated that the unlock criteria was to detect six concurrent touches, wherein the actual locations of the touches do not matter. The screen 204 may display some illustration of what is required of the recipient, for example, a picture of a user placing six fingers on the screen, or highlighting six example regions on the screen for the user to press. As the user touches the screen 204, visual feedback may be provided where a counter shows how many fingers are currently touching or how many more touches are required.

FIG. 11B shows a receiving device 1110 that may only display content upon detecting a specific movement of a touch along a path. The screen may display a starting touch point 1111 to highlight to the recipient where to start their touch. Once the user touches the touch point 1111, it may begin moving along the path 1112, to indicate to the user to follow the path at approximately the same speed. The touch path 1112 may be displayed at the same time that the touch point 1111 is displayed, or it may not be displayed at all, in which case the user must reactively move their finger along with the movement of the touch point 1111. Touch patterns that require timings and speed may cause the device to play a metronome sound or musical tune to aid the user with the timing of the pattern.

The touch path 1112 may be a randomly generated path, so the user may need to keep watch of the moving touch point 1111 and path (if displayed) to ensure they are following the path as it is being revealed. Alternatively, where a specific speed of movement is not required, the touch point 1111 may only move with the user's finger movement along the path 1112. The movement of the displayed touch point 1111 may be restrained to the path, or it may be allowed to move off the path, but resulting in the content ceasing to be displayed.

In the example device 1120 of FIG. 11O, although it shows a single message 1121 overlaying an empty screen like in example device 1100, it represents a different use-case to the examples provided above. In the example of FIG. 11C, the receiving device 1120 displays a prompt 1121 for a touch password before the received content can be displayed. Unlike example devices 1100 and 1110, the screen provides no indication of what the user must do to reveal the content item, but the user must use pre-acquired knowledge instead to enter the correct touch pattern. This example illustrates the authentication aspect of the proposed solution.

While specific touch combinations can help to inhibit the unwanted copying of received data, they can also act as a form of authentication. By not indicating to the recipient what pattern is required, the recipient must obtain the touch password by some other means, for example, by being told by the sender through a separate communication channel, or by pre-agreeing a password with the sender. The touch password may be specific to the recipient device and unknown to the sender, thus ensuring that only the owner of the receiving device can view the received message. The required password may be as simple as "hold two fingers down on any location", but if the user does not know that beforehand, even a simple touch password like this may be effective. More complicated touch passwords may require the user to hold on specific locations on the screen, in which case grids or other visual guidelines such as an array of circles may be displayed to aid the user in accurately entering the password. The touch password may be one of the dynamic passwords, such as a figure of eight pattern or a tapping to the rhythm of a song. The figure of eight pattern and rhythmic tapping may be useful choices of password as they would be easy for a sender to describe to a recipient user when disclosing the password.

Further authentication functionality may also be incorporated, such as automatically locking, or deleting, the content on detection of too many failed attempts. The outline of the entered password may be displayed to provide visual feedback to the user as they attempt to enter the password. The password may be required to be continuously entered so as to also ensure that the screenshot keys cannot be pressed, or the password may only need to be entered once for the content to be displayed. The metadata containing the indication of the required touch input may be encrypted or obfuscated, so that the recipient user cannot determine the password without being explicitly told by the sender.

The authentication aspect of the proposed solution may be extended further by involving more than two electronic devices. In addition to setting a password for displaying content, the sender may also indicate one or more additional contacts to be involved in the authentication process. These additional users may be required to also provide some form of user input before the recipient device may view the content.

An example where such a feature may be useful is if a manager wanted to send confidential information to an engineer at a remote location. To ensure that the engineer is being supervised while viewing this confidential information, to prevent a possible leak, the manager may also indicate that the engineer's supervisor must also provide user input before the content can be displayed to the engineer. The supervisor may choose to only provide the required user input at his mobile device while he is with the engineer in order to confirm that the engineer is being supervised and thereby authorised to view the content. The user input that the supervisor provides may be a touch password, or may be a simple press on a button, such that once the supervisor releases the button, the content disappears from the engineer's device. There may be more than one additional device involved, for example, if a sender knows that a receiver will be with a number of other users (such as at work or at a party), the sender could indicate that multiple users must concurrently tap and hold to unlock content at the receiver's device.

Figure 12:
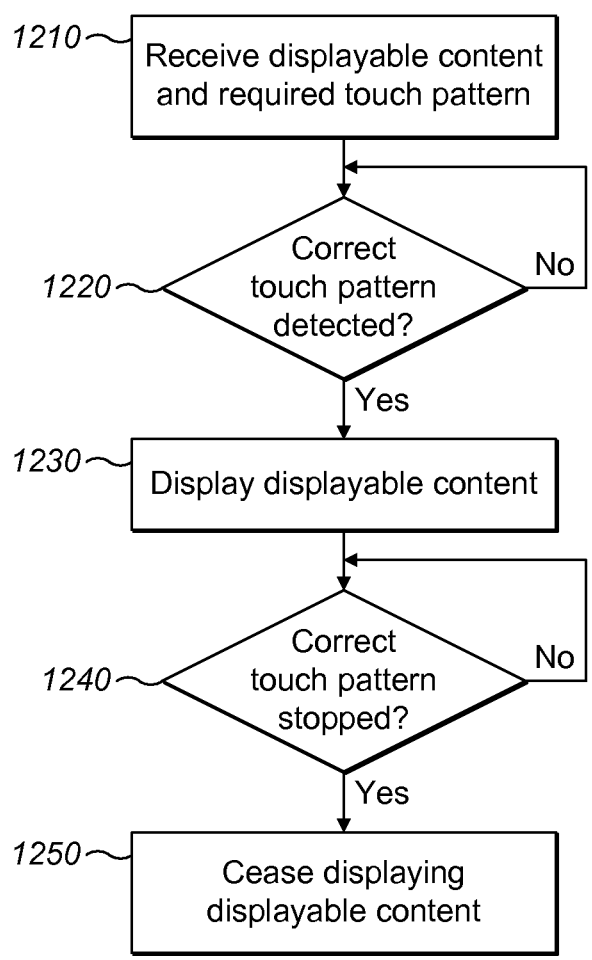
FIG. 12 is a flow chart showing the steps performed in a receiving device in accordance with an example embodiment.

FIG. 12 is a flow chart illustrating the steps performed at a recipient device in an example embodiment. At step 1210, the recipient device receives the displayable data and a required touch pattern. The required touch pattern may be information explicitly disclosing the touch pattern to the device, or may simply indicate a touch pattern already stored on the recipient device. At step 1220 the device determines if the touch pattern has been detected and continues to check until it has. Once the correct touch pattern has been detected, at step 1230 the received content is displayed on the device. The device itself may contain a display for displaying the content, or it may simply be connected to an external display, such as a monitor or projector, for displaying the content. Once the content has started being displayed, the device may continue monitoring 1240 if the touch pattern is still being displayed so that if it stops being detected, the device ceases to display the content 1250. After step 1250 the content may be deleted, or it may remain on the device to be displayed again when the touch pattern is detected again. In some embodiments, every time the content stops being displayed, the recipient must request a new touch pattern from the sending device before being able to view the content again.

In the example embodiment provided in FIG. 12, the content only ceases to display when the touch pattern is no longer being detected. In addition to this requirement, the system may also incorporate a self-destruction aspect to the content, so that after a certain amount of time the content will stop being displayed, regardless of whether the touch pattern is being detected. A timer may start upon detection of receipt of the correct touch pattern and will continue to count down until it expires, at which point the content ceases to be displayed. At the expiration of the timer, the content may be deleted from the device as well. Alternatively, at the expiration of the timer, the user may be required to request further access from the sender before the content will be displayed again. The duration of the timer may be set by the sending device and included in the metadata sent to the receiving device. The timer may be of the order of a few seconds, or of the order of days, or even longer.

It is to be understood that the present disclosure includes permutations of combinations of the optional features set out in the embodiments described above. In particular, it is to be understood that the features set out in the appended dependent claims are disclosed in combination with any other relevant independent claims that may be provided, and that this disclosure is not limited to only the combination of the features of those dependent claims with the independent claim from which they originally depend.

The invention claimed is:

1. A method at an electronic device including a user input device, the method comprising:
receiving, at the electronic device and from a sending device, first data comprising displayable content and second data indicating a security pattern that is to be detected on the electronic device in order to display the displayable content, wherein the second data indicates touch events corresponding to the security pattern of multiple touches, and the sending device is different than the electronic device;
while detecting, at the electronic device, touch events corresponding to the security pattern of multiple touches, displaying the displayable content on a display of the electronic device; and
removing the displayable content from the display as soon as the touch events corresponding to the security pattern of multiple touches are no longer detected at the electronic device.

2. The method of claim 1, wherein the second data indicates one of a plurality of security patterns of multiple touches stored on the electronic device.

3. The method of claim 2, wherein the second data indicates a complexity of the security pattern of multiple touches.

4. The method of claim 1, wherein the second data comprises details of the security pattern of multiple touches.

5. The method of claim 1, wherein displaying the displayable content triggers a timer, and an expiration of the timer causes the electronic device to remove the displayable content from the electronic device.

6. The method of claim 5, further comprising receiving an indication of a duration of the timer.

7. The method of claim 1, further comprising displaying the security pattern of multiple touches.

8. The method of claim 1, further comprising indicating when the detected touch events do not match the security pattern of multiple touches.

9. The method of claim 1, wherein the security pattern of multiple touches corresponds to individual touches detected at multiple locations on the electronic device.

10. The method of claim 1, wherein the security pattern of multiple touches corresponds to one or more touches moving over different locations on the electronic device.

11. The method of claim 1, wherein the displayable content is an image, or a video, or a text, or any combination thereof.

12. The method of claim 1, wherein the display and the user input device operate together as a touch-sensitive display.

13. The method of claim 1, wherein the user input device comprises one or more of the following: a touch-sensitive display, one or more hardware buttons, and a touch-sensitive panel.

14. An electronic device comprising:
a user input device;
one or more processors; and
memory comprising instructions which when executed by the one or more processors cause the electronic device to:
receive, at the electronic device and from a sending device, first data comprising displayable content and second data indicating a security pattern that is to be detected on the electronic device in order to display the displayable content, wherein the second data indicates touch events corresponding to the security pattern of multiple touches, and the sending device is different than the electronic device;
during detection of touch events corresponding to the security pattern of multiple touches at the electronic device, display the displayable content on a display of the electronic device; and
remove the displayable content from the display as soon as the touch events corresponding to the security pattern of multiple touches are no longer detected at the electronic device.

15. The electronic device of claim 14, wherein the second data indicates one of a plurality of security patterns of multiple touches stored on the electronic device.

16. The electronic device of claim 14, wherein the second data comprises details of the security pattern of multiple touches.

17. The electronic device of claim 14, wherein displaying the displayable content triggers a timer, and an expiration of the timer causes the electronic device to remove the displayable content from the electronic device.

18. The electronic device of claim 17, wherein the instructions which when executed by the one or more processors further cause the electronic device to receive an indication of a duration of the timer.

19. The electronic device of claim 14, wherein the memory comprises further instructions to display the security pattern of multiple touches.

20. The electronic device of claim 14, wherein the memory comprises further instructions to indicate when the detected touch events do not match the security pattern of multiple touches.

21. The electronic device of claim 14, wherein the security pattern of multiple touches corresponds to individual touches detected at multiple locations on the electronic device.

22. The electronic device of claim 14, wherein the security pattern of multiple touches corresponds to one or more touches moving over different locations on the electronic device.

23. The electronic device of claim 14, wherein the display and the user input device operate together as a touch-sensitive display.

24. The electronic device of claim 14, wherein the user input device comprises one or more of the following: a touch-sensitive display, one or more hardware buttons, and a touch-sensitive panel.

25. One or more non-transitory computer readable media comprising instructions, which when executed by one or more of the processors of an electronic device having a user input device, cause the electronic device to:
receive, at the electronic device and from a sending device, first data comprising displayable content and second data indicating a security pattern that is to be detected on the electronic device in order to display the displayable content, wherein the second data indicates touch events corresponding to the security pattern of multiple touches, and the sending device is different than the electronic device;
during detection of touch events corresponding to the security pattern of multiple touches at the electronic device, display the displayable content on a display of the electronic device; and
remove the displayable content from the display as soon as the touch events corresponding to the security pattern of multiple touches are no longer detected at the electronic device.

\* \* \* \* \*